(12) United States Patent
Friederich

(10) Patent No.: US 10,759,548 B2
(45) Date of Patent: Sep. 1, 2020

(54) CONTROLLER ARRANGEMENT WITH ADAPTIVE ADJUSTING OF THE REGULATING VARIABLE

(71) Applicant: Tesat-Spacecom GmbH & Co. KG, Backnang (DE)

(72) Inventor: Karl Georg Friederich, Weissach Im Tal (DE)

(73) Assignee: Tesat-Spacecom GmbH & Co. KG (DE)

( * ) Notice: Subject to any disclaimer, the term of this patent is extended or adjusted under 35 U.S.C. 154(b) by 98 days.

(21) Appl. No.: 16/106,248

(22) Filed: Aug. 21, 2018

(65) Prior Publication Data

US 2019/0071192 A1 Mar. 7, 2019

(30) Foreign Application Priority Data

Sep. 3, 2017 (DE) .......................... 10 2017 120 229

(51) Int. Cl.
*B64G 1/40* (2006.01)
*G05B 13/02* (2006.01)
(Continued)

(52) U.S. Cl.
CPC .............. *B64G 1/402* (2013.01); *B64G 1/242* (2013.01); *G05B 6/02* (2013.01); *G05B 13/021* (2013.01); *G05D 7/0623* (2013.01)

(58) Field of Classification Search
CPC .......... B64G 1/402; B64G 1/242; B64G 1/26; G05B 13/021; G05B 6/02; G05D 7/0623
See application file for complete search history.

(56) References Cited

U.S. PATENT DOCUMENTS 3,624,367 A   11/1971  Hamilton et al.
5,566,065 A * 10/1996  Hansen ................ G05B 13/027
                                                          700/44
(Continued)

FOREIGN PATENT DOCUMENTS

WO        0146581 A2    6/2001

OTHER PUBLICATIONS

French Search Report for Application No. FR1857770 dated Nov. 15, 2019, 1 page.

*Primary Examiner* — Jess Whittington
*Assistant Examiner* — Brian E Yang
(74) *Attorney, Agent, or Firm* — Lerner, David, Littenberg, Krumholz & Mentlik, LLP

(57) ABSTRACT

A controller arrangement includes a controller, an actuator, and a measuring element. The measuring element captures a control variable with a predetermined sampling rate in consecutive sampling cycles and transmits it to the controller. The controller compares the control variable with a predetermined reference variable and determines how the control variable differs from the reference variable. The controller, in a first cycle, starts with a predetermined regulating variable and outputs it to the actuator, and subsequently determines how the control variable differs from the reference variable; in a second cycle, the controller varies the regulating variable based on the difference of the control variable from the reference variable in the first cycle, and outputs it to the actuator, and subsequently determines how the control variable differs from the reference variable; in a third cycle, the controller varies the regulating variable and outputs it to the actuator.

20 Claims, 2 Drawing Sheets

(51) Int. Cl.
  *B64G 1/24* (2006.01)
  *G05B 6/02* (2006.01)
  *G05D 7/06* (2006.01)

(56) References Cited

U.S. PATENT DOCUMENTS

| | | | |
|---|---|---|---|
| 6,496,741 B1* | 12/2002 | Whiffen | G05B 13/024 244/158.1 |
| 7,559,509 B1 | 7/2009 | Kistler et al. | |
| 2006/0113129 A1* | 6/2006 | Tabata | B60K 6/543 180/65.25 |
| 2012/0037119 A1* | 2/2012 | Adler | F02D 41/2474 123/339.15 |
| 2015/0241863 A1 | 8/2015 | Lewin et al. | |
| 2017/0310105 A1* | 10/2017 | Shen | H02M 7/483 |

* cited by examiner

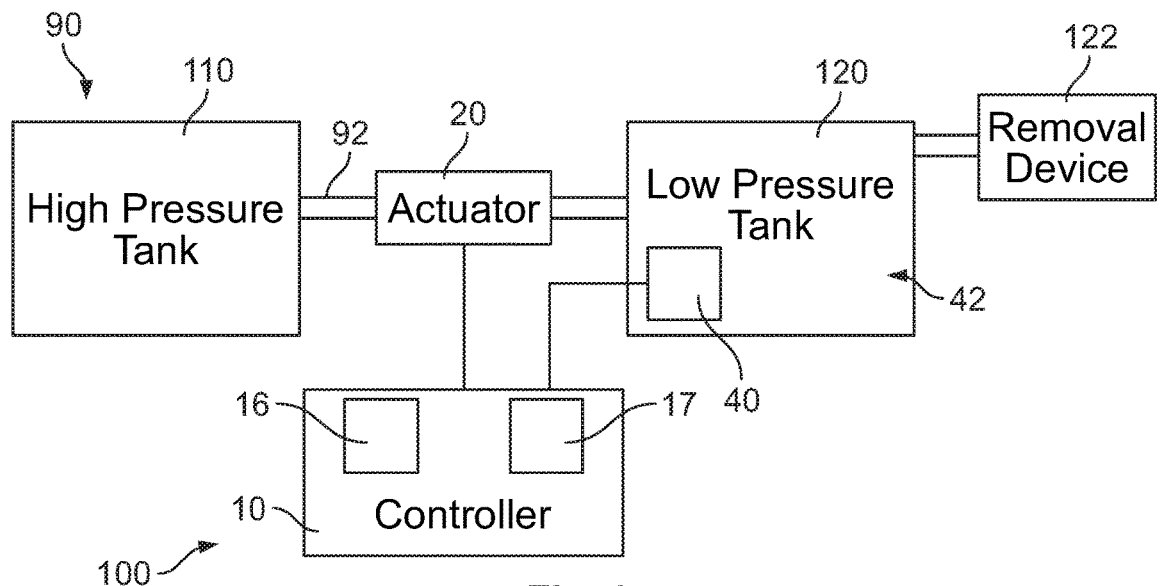
Fig. 3
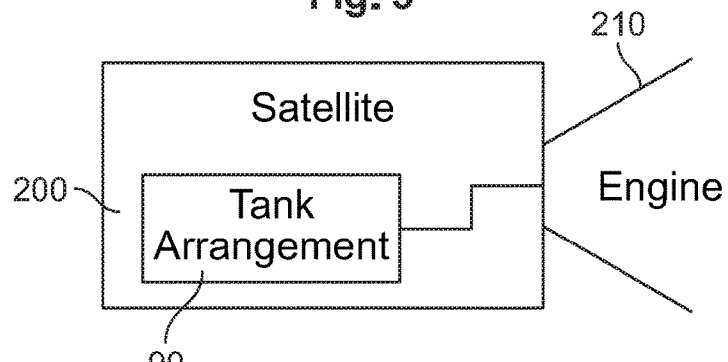
Fig. 4
| n Cycle | $R_{n-1}$ Previous Cycle | $R_{n-2}$ Penultimate Cycle | Op Increment or Decrement | ΔS Step Size Change | S Value Change |
|---|---|---|---|---|---|
| 0 | nn | nn | 0 | 0 | 16 |
| 1 | b | nn | i | x 1 | 16 |
| 2 | b | b | i | x 1 | 16 |
| 3 | b | b | i | x 1 | 16 |
| 4 | a | b | d | x 0,5 | 8 |
| 5 | a | a | d | x 1 | 8 |
| 6 | b | a | i | x 0,5 | 4 |
Fig. 5

CONTROLLER ARRANGEMENT WITH ADAPTIVE ADJUSTING OF THE REGULATING VARIABLE

FIELD OF THE INVENTION

The description generally relates to the technical field of control technology. In particular, the description relates to a controller arrangement for providing a regulating variable (controller output) for an actuator, a tank arrangement with such a controller arrangement, and a satellite with such a tank arrangement.

BACKGROUND OF THE INVENTION

Generally, controllers are used to adjust a control variable (may also be referred to as controlled variable, process variable, actual value, measured value) to a reference variable (set point, set value). Depending on the parameter to be controlled (e.g., temperature, pressure, voltage, charge or in general any physical parameter) and the system to be controlled (room, fluid tank, etc.), a more or less complex structure of the regulator may be necessary. A controller typically has to consider system dynamics in order to reliably adjust the control variable to the reference variable and within a reasonable time.

In the field of control engineering, for example, so-called PID controllers (proportional-integral-derivative controllers) are known. A PID controller requires detailed knowledge of the behavior of the system/parameter to be controlled. The coefficients for the PID controller will be set according to this behavior. If the dynamics of the controlled system change, it may be necessary to change the coefficients of the PID controller.

BRIEF SUMMARY OF THE INVENTION

There may be a need for a controller arrangement which allows rapid adjustment of a control variable to a predetermined reference variable with a small number of functional components.

According to a first aspect, a controller arrangement with a controller, an actuator, and a measuring element is provided. The measuring element is configured to capture a control variable with a predetermined sampling rate in consecutive sampling cycles and to transmit the control variable to the controller. The controller is configured to compare the control variable with a predetermined reference variable and to determine how the control variable deviates or differs from the reference variable (determine a difference between the control variable and the reference variable) and is further configured to start in a first cycle with a predetermined regulating variable for the actuator and output the regulating variable to the actuator and then to determine how the control variable deviates from the reference variable. The controller is further configured to vary the regulating variable by a variation value in a second cycle based on the deviation of the control variable from the reference variable (based on the determined difference between the control variable and the reference variable) in the first cycle, and to output the regulating variable to the actuator and to then determine how the control variable deviates from the reference variable. The controller is further configured to vary the regulating variable by a variation value in a third cycle based on the deviation of the control variable from the reference variable in the second cycle, if in the first cycle the control variable is smaller than the reference variable and in the second cycle the control variable is greater than or equal to the reference variable, or vice versa, and to output the regulating variable to the actuator.

The controller arrangement thus determines the regulating variable for the actuator based on the comparison of the control variable with the reference variable from the two preceding cycles, in particular from the two immediately preceding cycles.

Preferably, the measuring element is a sensor which is configured to detect a physical parameter. The physical parameter may be, for example, a temperature, a pressure, a filling level, electrical charge, or mass. The measuring element is further configured to convert a value of the physical parameter into a corresponding or associated signal or code and to transmit this signal or this code to the controller.

The controller contains at least one arithmetic unit (processing unit) or a processor and is designed to execute instructions or a calculation rule (can also be referred to as a control algorithm). The controller receives a signal from the measuring element and compares this signal with the reference variable (setpoint or nominal value). Based on the result of this comparison, the controller outputs a command to the actuator (the command is called the regulating variable), in order to influence the control variable.

The actuator is an arrangement that can influence a physical parameter (the control variable). For example, the actuator may be a valve which may affect a cross-section of a conduit or a flow rate through the conduit. The actuator may also be an electric actuator or generally a switch (e.g., transistor) that changes its properties depending on an applied electrical signal, or an electromechanical actuator (e.g., relay).

The controller arrangement works cyclically and, in particular, carries out the following steps: outputting the regulating variable to the actuator, determining a value of the control variable resulting from the regulating variable, comparing the value of the control variable with the predetermined value of the reference variable. In the next cycle, the regulating variable for the actuator is determined based on the comparison of the control variable with the reference variable from the one or the two preceding cycles. If in this description reference is made to a measuring cycle, or to a duty cycle, or general to a cycle, this is to be understood as at least the above-mentioned steps.

It is a particular aspect of the controller arrangement described herein that for determining whether a value of the regulating variable is increased or decreased, the ratio between the control variable and the reference variable from one previous cycle is used, and for setting a value by which the regulating variable is changed (the variation value or the step size) the ratio between the control variable and the reference variable from two, in particular exactly two, previous cycles is used. In particular, the control variable is compared with the reference variable and the result of the comparison based on the first detection of the control variable after the output of the regulating variable to the actuator is taken into account in order to determine the influence of the regulating variable on the control variable.

This makes it possible to determine and record the influence of the regulating variable on the control variable. Especially with systems to be controlled having a low or greatly varying dynamics, this approach may be advantageous and makes it possible to control such systems with a controller arrangement of low complexity. Systems that have low or greatly varying dynamics may be operated with a measuring element with a low sampling rate. However, if high dynamics are introduced into the system by the actuator, the low sampling rate of the measuring element may not be sufficient to determine when the actuator needs to be triggered again to change its state. The controller arrangement described here solves this conflict by recording the influence of the regulating variable on the control variable and by considering this influence when determining the future values of the regulating variable.

According to an embodiment, the controller is configured to determine the regulating variable in any cycle based on a comparison of the control variable with the reference variable from at most two preceding cycles.

This means that the regulating variable and also a variation value of the regulating variable is set based on how the regulating variable has influenced the control variable in the previous cycle or the two preceding cycles. If, for example, in the previous cycle the regulating variable resulted in the control variable remaining below the reference variable, then the regulating variable for the next cycle is increased. Of course, the same applies vice versa.

As a result, it may be sufficient for the controller arrangement to have two single memory cells which contain a value for each of the two preceding cycles, which value indicates whether the control variable was smaller than the reference variable or at least as great as (or greater than) the reference variable after outputting the regulating variable to the actuator. As a result, the controller arrangement may quickly adapt to the reference variable and keep the control variable close to the reference variable with little information about the history of the course of the control variable. The content of the memory cell concerning the immediately preceding cycle is used for determining whether the value of the regulating variable needs to be increased or decreased. The content of both memory cells is used to determine a change in the step size, if necessary.

This also makes it possible to omit a permanent memory which can store a system state and hold it for later use. The controller arrangement starts with a value for the regulating variable which is based on an estimate, and then approaches a value for the regulating variable with each cycle in order to keep the control variable within a predetermined range of the reference variable.

Thus, the controller arrangement described herein is particularly suitable for use in an environment that does not require a permanent control, and also in systems that are subject to high dynamics because the regulating variable may fluctuate by several orders of magnitude over the life of a system, for example.

The procedure in the third cycle may be described in particular as follows: the controller is configured to reduce the variation value in the third cycle if in the second cycle the control variable is smaller than the reference variable, and in the first cycle the control variable is greater than or equal to the reference variable, or to reduce the variation value if in the second cycle the control variable is greater than or equal to the reference variable and in the first cycle the control variable is smaller than the reference variable, otherwise to leave the variation value unchanged, and, based on the deviation of the control variable from the reference variable, to vary the regulating variable by the possibly reduced variation value and to output the regulating variable to the actuator (for example, when the control variable falls below a lower threshold value) and to then determine how the control variable deviates or differs from the reference variable.

In one embodiment, the controller is configured to determine if the control variable is smaller than the reference variable or at least equal to (greater than or equal to) the reference variable.

This means that for the controller arrangement described herein it is only of relevance whether the control variable reaches and/or exceeds the reference variable or remains below. The initial estimate of the regulating variable may be chosen so that a system state is not adversely affected. In any case, the initial estimate provides a good starting point for starting the operation of the controller arrangement. The regulating variable is then changed or varied as needed with each cycle to adapt the control variable to the reference variable.

According to an embodiment, the controller is configured to increase a value of the regulating variable by a variation value in the third cycle, if in the second cycle the control variable is smaller than the reference variable.

If it is determined that the regulating variable has not been sufficient at least in the previous cycle to bring the control variable to the reference variable, the amount or value of the regulating variable is increased by a variation value.

A maximum value which must not be exceeded by the controller may be set for both the regulating variable and the variation value. This serves not to allow the regulating variable to rise too fast to a too high value, in order to avoid a too fast change of the control variable.

According to a further embodiment, the controller is configured to increase a value of the variation value in the third cycle as compared to the second cycle if in the first cycle the control variable is smaller than the reference variable.

This embodiment describes that the amount by which the regulating variable is changed may also vary in order to bring the control variable to the reference variable in fewer cycles. In other words, the regulating variable is therefore not increased in equal or constant steps in this embodiment, but the steps by which the regulating variable is increased become larger. Again, however, it applies that the variation value may have a predetermined threshold value that is not exceeded.

According to a further embodiment, the controller is configured to reduce a value of the variation value in the third cycle as compared to the second cycle if in the first cycle the control variable is greater than or equal to the reference variable.

This embodiment describes that the regulating variable is increased in the third cycle and the variation value is reduced, if the control variable first exceeds the reference variable and then falls below it. In other words, the procedure is described when the regulating variable is too large and then too small.

According to a further embodiment, the controller is configured to reduce a value of the regulating variable by a variation value in the third cycle, if in the second cycle the control variable is greater than or equal to the reference variable.

In this embodiment, the control variable exceeds the reference variable in the second cycle. This means that the regulating variable was too high in the second cycle. So, in the third cycle, the regulating variable must be reduced compared to the regulating variable of the second cycle.

According to a further embodiment, the controller is configured to increase a value of the variation value in the third cycle as compared to the second cycle, if in the first cycle the control variable is greater than or equal to the reference variable.

In this embodiment, the control variable approached the reference variable from above and still exceeds it in the second cycle. The regulating variable was too large in the first cycle and was still too large in the second cycle. Thus, to allow a faster approximation of the control variable to the reference variable, the amount of the variation value is increased.

According to a further embodiment, the controller is configured to reduce a value of the variation value in the third cycle as compared to the second cycle, if in the first cycle the control variable is smaller than the reference variable.

Because the regulating variable has provided for a too small value of the control variable in the first cycle, but has provided for a too high (or equal) value in the second cycle, the value of the regulating variable in the third cycle as compared to the value of the regulating variable of the second cycle is reduced, but remains above the value of the regulating variable of the first cycle.

According to a further embodiment, the controller is configured to output the regulating variable to the actuator, when a value of the control variable reaches a predefinable limit.

The predefinable limit defines a range of values between the predetermined or predefinable value of the reference variable and the limit. In this defined value range, the control variable can vary without causing an action of the controller arrangement. However, if the control variable reaches the predefinable limit, the controller outputs the regulating variable to the actuator and thus influences the controlled system or the controlled system or the controlled process. The limit may be, for example, a lower limit for the control variable, for example, a lower temperature or a lower pressure value. As soon as this lower limit is reached, the controller outputs a signal (the regulating variable) to the actuator, which causes the actuator increasing the temperature or the pressure of the controlled system. Of course, this approach is also applicable to an upper limit of the control variable.

The controller arrangement described herein may be advantageously used in particular in such systems in which the control variable changes slowly due to influences of any kind, but the actuator causes a much faster change of the control variable, as do the other influences. A slow change in the control variable means that the control variable changes several orders of magnitude slower during the normal operation of the controlled system than due to the activated actuator. For example, if a pressure valve is used as an actuator to let a fluid flow from a first chamber into a second chamber, the pressure in the second chamber can be suddenly increased, whereas the pressure degrades only slowly when the valve is closed. In such a system, often due to the reaction time of the structural elements, in particular of the valve (actuator), an exact adjustment of the pressure in the second chamber cannot be used directly as a signal for closing of the valve. The controller arrangement described herein solves this problem by using the influence of the value of the regulating variable on the control variable in order to determine the value of the regulating variable for future cycles.

According to another aspect, a tank arrangement is provided. The tank arrangement comprises a high pressure tank, a low pressure tank, and a controller arrangement as described herein. The actuator is positioned in a fluid line between the high pressure tank and the low pressure tank, and the measuring element is arranged in the low pressure tank and is configured to detect a pressure in the low pressure tank and to transmit the detected pressure as a control variable to the controller.

For example, the tank arrangement may provide for transferring fluid from the high pressure tank to the low pressure tank by placing the actuator (e.g., a valve, a throttle, or the like) in an at least partially open condition and thereby allowing the fluid to flow from the high pressure tank into the low pressure tank due to the pressure differential. The high pressure tank may be a reserve tank or storage tank in which a fluid is stored for a long time, whereas the low pressure tank may be a working tank and serves a consumer to gather or remove the fluid.

If the pressure in the low pressure tank reaches a certain (lower) limit, this is the signal for the controller to open the actuator so that further fluid can flow from the high pressure tank into the low pressure tank. Depending on the opening duration of the actuator and also on the pressure in the high pressure tank, a certain amount of fluid flows from the high pressure tank into the low pressure tank, so that the pressure in the low pressure tank increases. The upper limit of the pressure in the low pressure tank may be specified as a reference variable. Depending on whether the pressure in the low pressure tank reaches and/or exceeds the reference value or remains below after a valve opening and closing operation, a value for the regulating variable (opening time of the actuator) is adapted for future cycles. Especially in such a scenario, the controller arrangement described herein is advantageous because the pressure in the high pressure tank changes greatly or by several orders of magnitude over time and the controller arrangement achieves an indirect adaptation of the control by the regulating variable, without having to permanently store a large number of parameters and values relating to the tank arrangement.

According to another aspect, there is provided a satellite having an engine (power plant, drive) and a tank arrangement as described above and below, wherein the low pressure tank is connected to the engine so that a fluid contained in the low pressure tank may be delivered to the engine.

The low pressure tank thus serves as a working tank for the engine and provides a fuel with a pressure within a predetermined value range, wherein the high pressure tank contains the entire fuel for a total mission duration or intended service life or lifetime of the satellite. Depending on the pressure in the high pressure tank, a value for the opening duration of the valve (regulating variable for the actuator) between the high pressure tank and the low pressure tank may initially be only a few milliseconds and, if the high pressure tank is emptied to a certain extent, up to a few seconds. The controller arrangement described herein enables to start with a carefully estimated value for the actuator, which value is adapted to the maximum pressure in the high pressure tank at the start of the mission, and then approach a larger value when the high pressure tank is gradually emptied, according to the embodiments described above.

The engine may only be used sporadically (for example, if the satellite requires orbit correction) and may be shut off between those periods of use. In the shut-off state of the satellite, the controller arrangement may also be switched off for reasons of energy efficiency. If the controller arrangement is turned on because the engine must be used, the pressure in the low pressure tank may be gradually approached to the target value without the controller arrangement requiring information from the period of use before the interim shut-off. Such information would have to be stored permanently and may entail great expense. The controller arrangement described herein may dispense with this since an estimate of the regulating variable is used after the engine and the controller arrangement have been switched on again, and the regulating variable is then adjusted stepwise in dependence on the influence of the regulating variable on the control variable.

The estimated value for the regulating variable may be taken from a look-up table which assigns a regulating variable for the actuator to a pressure value of the high pressure tank and possibly of the low pressure tank. In this table, temperature values of the high pressure tank and/or of the low pressure tank may also be considered when determining the estimated value for the regulating variable. The estimated value may also be calculated by calculating a multidimensional polynomial.

In all of the embodiments described herein, the controller may be implemented as an application specific integrated circuit (ASIC) or as a programmable logic gate (FPGA). To adjust the regulating variable for the actuator, only the effects of two previous cycles and, in particular, the information whether in these two previous cycles the pressure in the low pressure tank (the control variable) reaches or exceeds (case 1) the nominal value for the pressure (the reference variable) or remains below (case 2). To store this information in a memory (volatile), two memory cells that can store and output two different states are sufficient. This greatly reduces the need for memory cells. Similarly, only one comparator is required for the comparison of the reference variable with the control variable, wherein the comparator indicates whether the control variable is smaller than the reference variable, or at least equal to or greater than it.

BRIEF DESCRIPTION OF THE DRAWINGS

In the following, exemplary embodiments are described in more detail with reference to the attached drawings. The drawings are schematic and not to scale. Same reference signs refer to same or similar elements. It is shown in:

FIG. 3 a schematic representation of a tank arrangement according to an embodiment;

FIG. 4 a schematic representation of a satellite according to an embodiment;

FIG. 5 a tabular representation of a sequence of cycles of a controller arrangement according to another embodiment.

DETAILED DESCRIPTION

Figure 1:
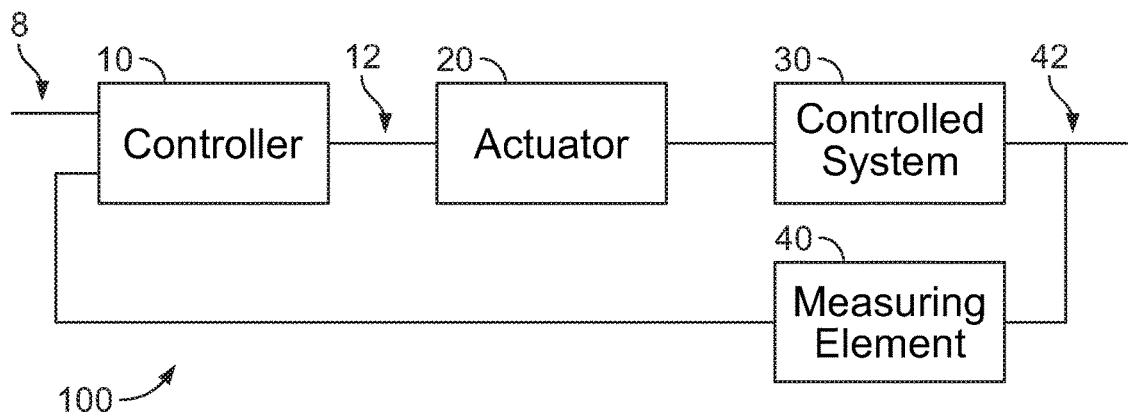
FIG. 1 a schematic representation of a controller arrangement according to an embodiment.

FIG. 1 shows a controller arrangement 100 and its components. The controller arrangement 100 receives as an input value the reference variable 8 (also nominal value). The reference variable 8 is sent to the controller 10 and the controller 10 determines, based among other things on the reference variable 8, a regulating variable 12. The regulating variable 12 is transmitted to the actuator 20. The actuator 20 has influence on the controlled system 30. A measuring element 40 (a sensor) is provided to detect the control variable 42 of the controlled system 30. The control variable 42 is typically a physical parameter that is measured. The associated measured value is converted into a signal and transmitted to the controller 10. Thus, the controller 10 receives both the measured control variable 42 and the predetermined reference variable 8 in order to determine the regulating variable 12 based on these two values.

Figure 2:
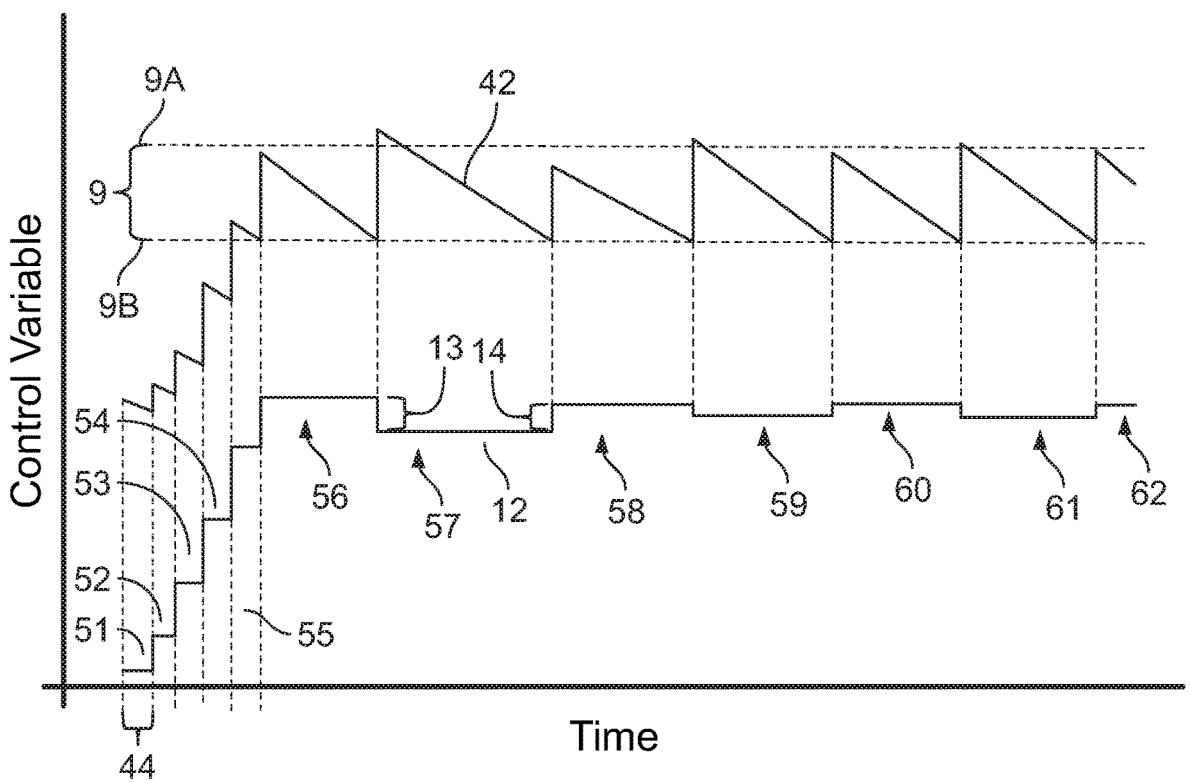
FIG. 2 a schematic representation of the course of the control variable and of the regulating variable of a controller arrangement according to an embodiment.

FIG. 2 shows in a schematic representation how the control variable 42 is regulated in such a way that it is within a value range 9 having an upper limit 9A and a lower limit 9B. In the representation of FIG. 2, a plurality of consecutive cycles 51 to 62 are shown, wherein in each of these cycles, the regulating variable is first output, then the control variable is detected to compare the control variable with the reference variable, and based on the result of this comparison, a value for the regulating variable of the next cycle is determined. In addition to the control variable 42, FIG. 2 also shows the course of the regulating variable 12.

It is the goal that the control variable 42 is within the value range 9. The exemplary course of the control variable 42 shown here shows a pressure curve in a tank, which is filled cyclically or on request with a fluid and from which fluid is withdrawn continuously or at intervals. As can be seen from the sawtooth-shaped course of the control variable 42, the pressure increases abruptly when supplying fluid (almost vertical course of the associated line between the lower limit and the upper limit) and then decreases significantly slower and continuously, wherein the pressure (the value of control variable 42) approaches the lower limit. If the value of the control variable 42 reaches the lower limit, the controller 10 sends a signal to the actuator 20 (see FIG. 1) so that the actuator 20 lets a fluid flow into the tank. In this example, the value of the regulating variable defines a duration that the actuator is opened to allow the fluid to flow into the tank. Depending on the flow rate of the fluid or the pressure with which the fluid is forced into the tank, and also depending on other parameters of the environment (for example, temperature in the tank, temperature of the fluid), the value of the regulating variable is different, in order for the pressure in the tank to rise to the upper limit.

In cycle 51, the control variable 42 is below the lower limit. As soon as the measuring element takes a measurement and transmits the value to the controller, the controller determines this for the control variable as a result of a comparison of the measured control variable with the lower limit of the value range, and outputs a corresponding signal (the regulating variable) to the actuator, so that the actuator can let additional fluid flow into the tank. The regulating variable defines the time duration which the actuator remains in the opened state. In the first cycle 51, the regulating variable may be an estimated or predetermined value.

In cycle 52, the control variable 42 is still below the lower limit. Thus, the steps of cycle 51 are repeated. Until the control variable 42 reaches the lower limit 9B of the value range 9 for the first time, the regulating variable may have a constant or same value. This is to avoid too large changes in the control variable in response to changing the regulating variable. The initial value of the regulating variable may be set to be based on the difference between the upper limit 9A and the lower limit 9B. In particular, the initial value of the regulating variable may be set so that it causes a change of the control variable by this difference. If the control variable is above the lower limit 9B right at the beginning, a required adaptation of the value of the regulating variable takes place immediately after the first output of the regulating variable.

In cycles 53 and 54, what has already been described with reference to cycles 51 and 52 is repeated. For the first time, control variable 42 exceeds the lower limit at the beginning of cycle 55. Thus, control variable 42 is now within the desired value range 9. However, by removing fluid from the tank, the value of the control variable decreases again in the direction of lower limit 9B. Once the lower limit is reached, the controller 10 again outputs a signal (regulating variable)

to the actuator 20. According to the value of the regulating variable, the value of the control variable 42 continues to approach the upper limit 9A with each cycle, but does not exceed it at the beginning of cycle 56.

In cycle 56, the value of the regulating variable 12 has reached its maximum. This can also be seen from the fact that at the beginning of cycle 57, the value of the control variable 42 clearly exceeds the upper limit 9A. This is detected by the measuring element and transmitted to the controller. Therefore, the value of the regulating variable is decreased or reduced for the next cycle. The consequence of this is that at the beginning of cycle 58, the control variable is below the upper limit.

The representation of the control variable 42 and of the regulating variable 12 in FIG. 2 is to be read so that the regulating variable shown in cycle 56 is the result of the control variable at the beginning of cycle 56 and is output to the actuator at the beginning of the next cycle, i.e., cycle 57. Hence, the value of the regulating variable 12 has its maximum in cycle 56, but this value is output to the actuator only at the beginning of cycle 57, which can also be recognized by the fact that at the beginning of cycle 57, the control variable 42 has its maximum.

To keep the number of switching operations of the actuator as low as possible, it is aimed that the pressure at the beginning of a cycle is as close as possible to the upper limit. Thus, the duration until the next switching operation (until the control variable 42 reaches the lower limit) can be maximized.

After the value of the regulating variable was too small at the beginning of cycle 58 (control variable 42 is clearly below the upper limit), the regulating variable is increased again for cycle 59. However, the regulating variable for cycle 59 is not increased so much that it corresponds to the regulating variable of cycle 57, because this value was too high. Because of this, the value of the regulating variable 12 for cycle 59 is set to the mean value between the values of the regulating variable of the two previous cycles. This is shown in FIG. 2 by the fact that the variation value 13 is greater, in particular twice as large, as the variation value 14. The variation value 13 indicates by which value the regulating variable for cycle 57 differs from the value of the regulating variable for cycle 58. The variation value 14 indicates by which value the regulating variable for cycle 58 differs from the value of the regulating variable for cycle 59.

In the following cycles 59 to 62, the value of the regulating variable 12 approaches a value which, under the present conditions, approaches the pressure (i.e., the control variable 42) at the beginning of a cycle, i.e., immediately after the opening and closing of the actuator, to the upper limit as best as possible. Under these circumstances, the pressure approaches the upper limit successively.

In FIG. 2 furthermore shows a measuring cycle duration 44 which corresponds to a sampling rate of the measuring element 40. The measuring cycle duration 44 is significantly longer than the value of the regulating variable, i.e., the duration which the actuator is open. For this reason, the measuring element cannot be used to give a signal for closing the actuator. Until the measuring element provides such a signal, the reference variable can already be clearly exceeded and may cause damage to the regulated system.

For the purposes of this description, it is to be understood that a cycle has a minimum duration dictated by the sampling rate of the measuring element and/or the delay due to the characteristics of the actuator (time interval between closure of the actuator and the next sampling of the control variable, delay due to mechanical or movable parts of the actuator). The maximum duration of a cycle depends on reaching of the lower limit 9B, and, in particular, on the amount of flown fluid.

The variation value 13, 14 for the regulating variable within a cycle may have a minimum value and a maximum value, wherein the minimum value is not undercut, and the maximum value is not exceeded. Even if the controller 10 determines a variation value that violates this specification, the minimum value or the maximum value of the variation value becomes applied. Even if the regulating variable has reached a suitable value, the regulating variable may fluctuate about the steady state with the minimum value of the variation value.

In the case of an increasing variation value, in order to be able to readjust a control variable that is running away, more than two measured values from the history can be taken into account. In that case, the controller has a corresponding number of memory cells. The historical values may be used to determine an amount for the variation value. A plurality of historical values may be used to determine for how many of them the control variable exceeds (or falls below) the reference variable. Depending on this number, the variation value can be determined. In the simplest case, counters whose counter value is reset once their content has been used for determining a larger variation value can be used for this purpose. This ensures that the same historical data is not used for multiple adjustment of the variation value.

To compare the control variable with the reference variable, the controller 10 can use analog-to-digital converters or comparators.

It should be noted that in FIG. 2 the relationships and the changes of the values of the control variable and of the regulating variable are shown only qualitatively and the representation is not to scale. This applies in particular to the values by which the regulating variable 12 is changed between the individual cycles.

The steps described with reference to FIG. 2 are executed by the controller of FIG. 1. The controller 10 may be designed as a circuit or a processor and be present, for example, in the form of a programmable logic gate (FPGA).

FIG. 3 shows a tank arrangement 90 having a high pressure tank 110 and a low pressure tank 120. Between the high pressure tank 110 and the low pressure tank 120, a fluid conduit 92 is arranged to direct a fluid from the high pressure tank 110 into the low pressure tank 120. A controllable valve is arranged in the fluid line 92. This controllable valve may also be referred to as an actuator 20. The actuator 20 can completely block the passage between the high pressure tank 110 and the low pressure tank 120 and release it partially or completely. Due to a pressure difference between the high pressure tank and the low pressure tank, fluid can flow from the high pressure tank into the low pressure tank.

The high pressure tank can serve for the long-term storage of a fluid, whereas the low pressure tank can be referred to as a working tank and serves for the regular removal or withdrawal of fluid. It may be required that there is a low pressure or a pressure in a certain value range in the working tank, which pressure deviates significantly from the pressure in the high pressure tank, in particular is lower than the pressure in the high pressure tank.

In the low pressure tank 120, the measuring element 40 is arranged to measure the pressure. The pressure is used as a control variable 42. A corresponding signal is transmitted from the measuring element 40 to the controller 10 and the controller 10 controls the actuator 20 based on the control variable 42 and the reference variable 8 (in FIG. 3 not shown, see FIG. 1). At the low pressure tank 120, a removal device 122 is arranged, which makes it possible to remove fluid from the low pressure tank 120 and provide the removed fluid to a consumer (e.g., the engine 210, FIG. 4).

In FIG. 3 is further shown that the controller 10 has two memory cells 16, 17. These two memory cells are used to store information about the comparison of the control variable 42 with the reference variable 8 and to provide the information for the determination of the regulating variable 12.

FIG. 4 shows an exemplary application for a tank arrangement 90 that is shown in FIG. 3. The tank arrangement 90 is used to hold and provide fuel for an engine 210 of a satellite 200. In the high pressure tank 110, the fuel for the entire mission or a certain life span is kept, whereas the low pressure tank 120 serves to supply the engine 210 directly. The reason for this splitting up may be that the engine must be supplied with fuel in a certain pressure range. In the high pressure tank, however, the pressure is dependent on the filling level and other environmental conditions. At the beginning of the mission, the pressure in the high pressure tank is very high (over 100 bar) because the high pressure tank is completely filled. At the end of the mission, however, the pressure in the high pressure tank is approaching more and more the working pressure in the low pressure tank (e.g., about 2 to 3 bar). According to the pressure difference between the high pressure tank and the low pressure tank, the value of the regulating variable for the actuator 20 is to be chosen. With a large pressure difference, the working pressure in the low pressure tank is reached much faster than at a low pressure difference. Especially in such an environment, the controller must cover high dynamics and set switching times as a regulating variable for the actuator 20 from a few milliseconds at the beginning to a few seconds at the end.

The regulator assembly 100 may be used in this example as a pressure reducer for space applications. However, it should be appreciated that the controller assembly 100 described herein may be used for other purposes in which a control variable must be maintained within a predetermined range of values while minimizing the number of switching cycles of an actuator.

FIG. 5 shows in tabular form a sequence of several cycles of the controller arrangement described herein. Each cycle is shown as one line and is indexed with a digit between 0 and 6 and the letter n. It is assumed that the controller arrangement starts operating in cycle 0.

The second and third columns from the left indicate whether the control variable reaches and/or exceeds the reference variable (the upper limit of FIG. 2) (a, above) or remains below (b, below) (nn indicates that there is no value for a previous cycle). The second column $R_{n-1}$ shows this information for the previous cycle and the third column $R_{n-2}$ for the penultimate cycle.

The fourth column Op indicates whether the value of the regulating variable is increased by the increment (the variation value) (i, increment) or lowered (d, decrement). In cycle 0, a predefined value or an estimated value is used as the regulating variable. Therefore, in cycle 0 in the fourth column is the value 0. The fifth column ΔS indicates how the value of the step size is changed. In cycle 0, the value of the regulating variable is not changed. Finally, the sixth column S shows the value by which the regulating variable is changed.

As already described, the controller arrangement starts operating in cycle 0. Therefore, there are no historical data from previous cycles, and the second and third columns do not show a value. The same applies to the fourth and the fifth column, which are filled with default values. Whether the value of the regulating variable must be increased or reduced (column 4) is first obtained after the first measurement of the control variable. In cycle 0, a step size of 16 units for varying or changing the regulating variable is specified. This may be, for example, 16 ms.

In cycle 1, a measured value of the control variable can already be used, so that it is indicated in column 2 that the control variable is lower than the reference variable (column 2 shows b). It follows that the value of the regulating variable must be increased (column 4 shows b). The increment or step size for increasing the regulating variable from cycle 0 can be retained, i.e., it is multiplied by the value 1. This can be done, for example, so as not to change the step size excessively.

In cycle 2 there are already two past values which both show that the control variable is lower than the reference variable (column 2 and also column 3 show b). As a consequence, the regulating variable is further increased, namely with step size 16. The same applies to cycle 3.

In cycle 4, however, it is indicated that in the previous cycle 3 (column 2 shows a) the reference variable, in particular the upper limit of FIG. 2, has been exceeded. From this it can be concluded that the value of the regulating variable is too high and column 4 indicates that the value of the regulating variable is reduced (column 4 shows d). However, the value of the regulating variable is not reduced by 16, but only by half thereof, compare column 5, which indicates that the step size is multiplied by 0.5. The variation value (ΔS) in cycle 4 is reduced because in one of the previous cycles the reference variable was exceeded and in the other previous cycle it was undershot. (The same applies to cycle 6, but with different signs)

In cycle 5, it is clear that in both of the previous cycles 3 and 4 the reference variable has been exceeded so that the value of the regulating variable must be reduced again. As a result, in cycle 4 and 5, the value of the regulating variable was reduced by 16 units, so that the value of the regulating variable is again where it was at the beginning of cycle 3, before it was increased by 16 units. In cycle 6, of course, it is again determined that the control variable is below the reference variable, but in cycle 6 the regulating variable is increased by a smaller value than in cycle 3. In cycle 6, the value of the regulating variable is increased by 4 units.

Both the value of the regulating variable and the value by which the regulating variable can be changed may be powers to base 2. This has the advantage that division operations can be performed by simple shift operations in a memory register to obtain the new value upon a change in the regulating variable or the variation value.

In FIG. 2 and in FIG. 5 is was shown by way of example how the regulating variable has been set to a suitable value successively and by decreasing changes or step sizes. However, the operation of the controller arrangement may also be adapted so that the step size at which the regulating variable is changed, may also increase in successive cycles in order to follow changes in the controlled system faster.

Additionally, it is noted that "comprising" or "including" does not exclude any other elements or steps and "a" or "an" does not exclude a multitude or plurality. It is further noted that features or steps which are described with reference to one of the above exemplary embodiments may also be used in combination with other features or steps of other exemplary embodiments described above. Reference signs in the claims are not to be construed as a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 8 reference variable
9 value range of control variable
9A upper limit
9B lower limit
10 controller
12 regulating variable
13 first variation value
14 second variation value
16 memory cell
17 memory cell
20 actuator
30 controlled system
40 measuring element with predetermined sampling rate or measuring cycle
42 control variable
44 measuring cycle duration
51-62 cycles
90 tank arrangement
92 fluid line
100 controller arrangement
110 high pressure tank
120 low pressure tank
122 removal device
200 satellite
210 engine

The invention claimed is:

1. A controller arrangement, comprising:
a controller;
an actuator; and
a measuring element;
wherein the measuring element is configured to capture a control variable with a predetermined sampling rate in consecutive sampling cycles and to transmit the captured control variable to the controller;
wherein the controller is configured to compare the captured control variable with a predetermined reference variable and to determine how the captured control variable differs from the reference variable;
wherein the controller is configured to start in a first cycle with a predetermined regulating variable for the actuator and to output the regulating variable to the actuator and then to determine how the control variable differs from the reference variable;
wherein the controller is configured to vary the regulating variable by a variation value in a second cycle based on the difference of the control variable from the reference variable in the first cycle, and to output the regulating variable to the actuator and to then determine how the control variable differs from the reference variable; and
wherein the controller is configured to vary the regulating variable by a variation value in a third cycle based on the difference of the control variable from the reference variable in the second cycle, if in the first cycle the control variable is less than the reference variable and in the second cycle the control variable is greater than or equal to the reference variable, or vice versa, and to output the regulating variable to the actuator.

2. The controller arrangement of claim 1, wherein the controller is configured to determine the regulating variable in any cycle based on a comparison of the control variable with the reference variable from a current cycle and at most two preceding cycles.

3. The controller arrangement of claim 1, wherein the controller is configured to determine if the control variable is less than the reference variable or greater than or equal to the reference variable.

4. The controller arrangement of claim 1, wherein the controller is configured to increase a value of the regulating variable by a variation value in the third cycle, if in the second cycle the control variable is less than the reference variable.

5. The controller arrangement of claim 4, wherein the controller is configured to increase a value of the variation value in the third cycle as compared to the second cycle, if in the first cycle the control variable is less than the reference variable.

6. The controller arrangement of claim 4, wherein the controller is configured to decrease a value of the variation value in the third cycle as compared to the second cycle, if in the first cycle the control variable is greater than or equal to the reference variable.

7. The controller arrangement of claim 1, wherein the controller is configured to decrease a value of the regulating variable by a variation value in the third cycle, if in the second cycle the control variable is greater than or equal to the reference variable.

8. The controller arrangement of claim 7, wherein the controller is configured to increase a value of the variation value in the third cycle as compared to the second cycle, if in the first cycle the control variable is greater than or equal to the reference variable.

9. The controller arrangement of claim 7, wherein the controller is configured to decrease a value of the variation value in the third cycle as compared to the second cycle, if in the first cycle the control variable is less than the reference variable.

10. The controller arrangement of claim 1, wherein the controller is configured to output the regulating variable to the actuator, if a value of the control variable reaches a predefined limit.

11. A tank arrangement, comprising:
a high pressure tank;
a low pressure tank;
a fluid line interconnecting the high pressure tank and the low pressure tank; and
a controller arrangement;
wherein the controller arrangement comprises:
a controller;
an actuator; and
a measuring element;
wherein the measuring element is configured to capture a control variable with a predetermined sampling rate in consecutive sampling cycles and to transmit the captured control variable to the controller;
wherein the controller is configured to compare the captured control variable with a predetermined reference variable and to determine how the control variable differs from the reference variable;

wherein the controller is configured to start in a first cycle with a predetermined regulating variable for the actuator and to output the regulating variable to the actuator and then to determine how the control variable differs from the reference variable;

wherein the controller is configured to vary the regulating variable by a variation value in a second cycle based on the difference of the control variable from the reference variable in the first cycle, and to output the regulating variable to the actuator and to then determine how the control variable differs from the reference variable;

wherein the controller is configured to vary the regulating variable by a variation value in a third cycle based on the difference of the control variable from the reference variable in the second cycle, if in the first cycle the control variable is less than the reference variable and in the second cycle the control variable is greater than or equal to the reference variable, or vice versa, and to output the regulating variable to the actuator;

wherein the actuator is arranged in the fluid line between the high pressure tank and the low pressure tank; and wherein the measuring element is arranged in the low pressure tank and is configured to detect a pressure in the low pressure tank and to transmit the detected pressure as a control variable to the controller.

12. The tank arrangement of claim 11, wherein the controller is configured to determine the regulating variable in any cycle based on a comparison of the control variable with the reference variable from a current cycle and at most two preceding cycles.

13. The tank arrangement of claim 11, wherein the controller is configured to determine if the control variable is less than the reference variable or greater than or equal to the reference variable.

14. The tank arrangement of claim 11, wherein the controller is configured to increase a value of the regulating variable by a variation value in the third cycle, if in the second cycle the control variable is less than the reference variable.

15. The tank arrangement of claim 14, wherein the controller is configured to increase a value of the variation value in the third cycle as compared to the second cycle, if in the first cycle the control variable is less than the reference variable.

16. The tank arrangement of claim 14, wherein the controller is configured to decrease a value of the variation value in the third cycle as compared to the second cycle, if in the first cycle the control variable is greater than or equal to the reference variable.

17. The tank arrangement of claim 11, wherein the controller is configured to decrease a value of the regulating variable by a variation value in the third cycle, if in the second cycle the control variable is greater than or equal to the reference variable.

18. The tank arrangement of claim 17, wherein the controller is configured to increase a value of the variation value in the third cycle as compared to the second cycle, if in the first cycle the control variable is greater than or equal to the reference variable.

19. The tank arrangement of claim 17, wherein the controller is configured to decrease a value of the variation value in the third cycle as compared to the second cycle, if in the first cycle the control variable is less than the reference variable.

20. A satellite, comprising:

an engine; and a tank arrangement;

wherein the tank arrangement comprises:

a high pressure tank;

a low pressure tank;

a fluid line interconnecting the high pressure tank and the low pressure tank; and a controller arrangement;

wherein the controller arrangement comprises:

a controller;

an actuator; and a measuring element;

wherein the measuring element is configured to capture a control variable with a predetermined sampling rate in consecutive sampling cycles and to transmit the captured control variable to the controller;

wherein the controller is configured to compare the captured control variable with a predetermined reference variable and to determine how the control variable differs from the reference variable;

wherein the controller is configured to start in a first cycle with a predetermined regulating variable for the actuator and to output the regulating variable to the actuator and then to determine how the control variable differs from the reference variable;

wherein the controller is configured to vary the regulating variable by a variation value in a second cycle based on the difference of the control variable from the reference variable in the first cycle, and to output the regulating variable to the actuator and to then determine how the control variable differs from the reference variable;

wherein the controller is configured to vary the regulating variable by a variation value in a third cycle based on the difference of the control variable from the reference variable in the second cycle, if in the first cycle the control variable is less than the reference variable and in the second cycle the control variable is greater than or equal to the reference variable, or vice versa, and to output the regulating variable to the actuator;

wherein the actuator is arranged in the fluid line between the high pressure tank and the low pressure tank;

wherein the measuring element is arranged in the low pressure tank and is configured to detect a pressure in the low pressure tank and to transmit the detected pressure as a control variable to the controller; and wherein the low pressure tank is connected to the engine so that a fluid contained in the low pressure tank can be delivered to the engine.

* * * * *